United States Patent [19]

Tomita

[11] Patent Number: 4,658,653

[45] Date of Patent: Apr. 21, 1987

[54] ELECTROMAGNETIC FLOWMETER

[75] Inventor: Toyofumi Tomita, Tokyo, Japan

[73] Assignee: Kabushiki Kaisha Toshiba, Kawasaki, Japan

[21] Appl. No.: 810,260

[22] Filed: Dec. 18, 1985

[30] Foreign Application Priority Data

Dec. 28, 1984 [JP] Japan .................................. 59-274608

[51] Int. Cl.$^4$ ............................................. G01F 1/60
[52] U.S. Cl. ................................. 73/861.12; 73/861.17
[58] Field of Search .......................... 73/861.12, 861.17

[56] References Cited

U.S. PATENT DOCUMENTS 3,855,858 12/1974 Cushing ............................ 73/861.17

FOREIGN PATENT DOCUMENTS

60-55230 3/1985 Japan .
60-56221 4/1985 Japan .

Primary Examiner—Herbert Goldstein
Attorney, Agent, or Firm—Oblon, Fisher, Spivak, McClelland & Maier

[57] ABSTRACT

Excitation coils apply a magnetic flux corresponding to the excitation current to a fluid. An electromotive force induces in the fluid and the amplified electromotive force is supplied to first and second filter circuits. The first circuit generates a predetermined signal upon reception of a signal of a frequency higher than a first frequency. The second circuit generates a predetermined signal upon reception of a signal of a frequency lower than a second frequency which is lower than the first frequency. The contents of a flip-flop are inverted at every given period. A selection circuit outputs one of signals having the first and second frequencies as an excitation signal in response to the contents of the flip-flop. In response to the excitation signal, an exciting circuit selectively supplies to excitation coils a first excitation current of a frequency higher than the first frequency and a second excitation current of a frequency lower than the second frequency. When the exciting circuit outputs the first excitation current and the second circuit generates the predetermined signal, and when the exciting circuit outputs the second excitation current and the first circuit generates the predetermined signal. Thereby the control circuit prevents the flip-flop from being inverted.

11 Claims, 27 Drawing Figures

ELECTROMAGNETIC FLOWMETER

BACKGROUND OF THE INVENTION

The present invention relates to an electromagnetic flowmeter using a square wave excitation current and, more particularly, to an improvement in a means for generating the excitation current.

A conventional electromagnetic flowmeter using a square wave excitation current measures the flow rate of a fluid to be measured in the following manner.

An excitation circuit applies a square wave excitation current to an excitation coil. The magnetic flux generated by the excitation coil is applied to the conductive fluid to be measured. An electromotive force is induced in the fluid in proportion to the magnetic flux and the flow velocity of the fluid, and is detected by a pair of electrodes. When the magnetic flux is stabilized, i.e., immediately before the direction of the magnetic flux is changed, the detected electromotive force is sampled. The average flow rate of the fluid is calculated based upon the sample value.

In the electromagnetic flowmeter with the above arrangement, the electromotive force detected by the electrodes is sampled twice in each cycle of the excitation current. A difference between two time-sequentially adjacent sample values is then generated. If such a sampling method is used, a noise component (e.g., a signal of frequency 2n times of a frequency [excitation frequency] of the excitation current [n is a positive integer], or a signal of a frequency considerably lower than the excitation frequency) can be removed from the signal representing the flow rate. Since the induction noise component of a commercial power source normally has the largest influence, the excitation frequency is set to be $\frac{1}{2}n$ (mainly, $\frac{1}{2}$: n is a positive integer) of the frequency of the commercial power source.

The electrode pair of the electromagnetic flowmeter having the above arrangement is brought into direct contact with the fluid to be measured. For this reason, an electromotive force not associated with one corresponding to the flow rate of the fluid is generated at the electrode pair due to the electrochemical effect of the surfaces of the electrodes and ions contained in the fluid. This electromotive force is called an electrochemical noise. The voltage level of the electrochemical noise is very high, e.g., 10 to 100 times that of the electromotive force corresponding to the flow rate of the fluid. However, the noise normally is a lower frequency than the excitation frequency. For this reason, when sampling is performed, the electrochemical noise can be removed.

The electrochemical noise is largely influenced by the surface state of the electrodes. For example, the noise is changed by slight movement of a fluid in accordance with abrupt pressure variation in a pipe coupled to the electromagnetic flowmeter.

The abrupt pressure variation in the pipe often occurs when a piston pump is used when fluid is not flowing. The piston pump has a normal operation range of about 0.1 to 3 Hz. However, in a double-acting multicylinder pump and the like, the delivery pressure waveform has a frequency component 4 times the pump rotational speed. For this reason, the electrochemical noise has the same frequency component as that of the delivery pressure, and the frequency of the electrochemical noise undesirably coincides with that of the excitation current.

When the frequency of the electrochemical noise coincides with that of the excitation current, the electromagnetic flowmeter operates erroneously. Even if fluid is not flowing, the electromagnetic flowmeter generates a flow rate output, or the flow rate output therefrom is varied, thus preventing normal operation of the flowmeter. In order to overcome this problem, a buffer tank is provided at the delivery side of the pump so as not to change the pressure. However, this method increases cost and requires more space. Alternatively, the excitation frequency can be increased. However, the operation frequency range of the pump is very wide. For this reason, it is difficult to determine the frequency of the electrochemical noise, and the excitation frequency cannot be controlled precisely. When an electromagnetic flowmeter is operated by a square wave excitation current having a high frequency, the response characteristic of the magnetic circuit of the detector must be improved. For this reason, peripheral equipment requires higher precision and power. This increases cost and power consumption of the entire electromagnetic flowmeter.

SUMMARY OF THE INVENTION

It is an object of the present invention to provide an electromagnetic flowmeter which can precisely measure the flow rate of a fluid.

An electromagnetic flowmeter according to the present invention, comprises:

a measuring pipe (11) through which a conductive fluid to be measured can flow;

at least one excitation coil (12) for applying, upon reception of an excitation current, a magnetic flux corresponding to the excitation current to the fluid in the measuring pipe;

electrodes (13) for detecting the electromotive force induced in the fluid due to a mutual effect of the fluid and the magnetic flux applied to the fluid by the excitation coil;

noise detection means (23, 24) for detecting, upon reception of the electromotive force detected by the electrodes, the noise included in the electromotive force;

excitation current supply means (25 to 34) for alternately and selectively supplying, upon reception of an output signal from the noise detection means, at least two types of excitation currents to the excitation coil at a predetermined period when the noise detection means detects no noise, and for supplying one excitation current which has a frequency farthest from the frequency of the noise among the plurality of excitation currents when the noise detection means detects the noise; and flow rate detection mens (21, 22, 36) for calculating, upon reception of the electromotive force detected by the electrode, the flow rate of the fluid based upon the voltage level of the electromotive force.

With the above arrangement, normally, the electromagnetic flowmeter switches the frequencies of excitation currents when generating them. On the other hand, when noise is detected, the excitation coil is excited by the excitation current of the frequency farther from that of the noise.

In general, the output from an electromagnetic flowmeter becomes unstable since the frequency of the noise coincides with or becomes adjacent to that of the excitation current. However, according to the present invention, when a noise component is generated, the excitation coil is excited by the excitation current of the frequency farther from that of the noise component. For this reason, the frequency of the electrochemical noise component does not coincide with or become adjacent to that of the excitation current. Influence of the electrochemical noise component can be removed from the measurement value of the electromagnetic flowmeter, and the flow rate of the fluid to be measured can be more precisely measured.

BRIEF DESCRIPTION OF THE DRAWINGS

FIGS. 2A to 2M and 3A to 3J are timing charts for explaining the operation of the electromagnetic flowmeter shown in FIG. 1;

DETAILED DESCRIPTION OF THE PREFERRED EMBODIMENT

An electromagnetic flowmeter according to an embodiment of the present invention will be described with reference to FIGS. 1, 2A to 2M and 3A to 3J.

An arrangement of the electromagnetic flowmeter according to the embodiment of the present invention will be described first with reference to FIG. 1.

The electromagnetic flowmeter comprises a detector 10 and a signal converter 20. The detector 10 detects an electromotive force proportional to an average of flow velocity of a conductive fluid to be measured. On the other hand, the signal converter 20 converts the electromotive force detected by the detector 10 into a signal proportional to the flow velocity (flow rate) of the fluid.

The detector 10 has the following configuration. A measuring pipe 11 through which the conductive fluid can flow is provided. A pair of excitation coils 12 are provided adjacent to the pipe 11. The coils 12 form a magnetic flux in a direction perpendicular to the axis of the pipe 11, and applies the magnetic flux to the fluid in the pipe 11. Electrodes, for example, a pair of electrodes, 13 are provided at positions perpendicular to the magnetic flux generated by the coils 12 and the axial direction of the pipe 11. The electrodes 13 are disposed on the inner wall of the pipe 11 so as to derive the electromotive force induced according to the Faraday's law from the fluid.

The signal converter 20 has the following configuration. Input terminals of a pre-amplifier 21 are connected to the electrodes 13. The pre-amplifier 21 differentially amplifies the signal (electromotive force) detected by the electrodes 13. An output signal from the pre-amplifier 21 is supplied to the input terminal of a sample-and-hold circuit 22.

The output signal from the pre-amplifier 21 is also supplied to input terminals of a high-pass filter circuit 23 and a low-pass filter circuit 24. These circuits 23, 24 operate as a kind of noise detector. The high-pass filter circuit 23 generates an H-level signal FH when the output signal from the pre-amplifier 21 includes a signal component of a frequency higher than a predetermined cut-off frequency and when its average voltage level is higher than a predetermined level. On the other hand, the low-pass filter circuit 24 generates an H-level signal FL when the output signal from the pre-amplifier 21 includes a signal component of a frequency lower than a predetermined cut-off frequency and when its average voltage level is higher than a predetermined level.

The output signal FH from the circuit 23 is supplied to one input terminal of a NOR gate 25. The output signal FL from the circuit 24 is supplied to one input terminal of a NOR gate 26.

A clock signal CLK generated from a first oscillator 27 is supplied to a clock input terminal of a negative-edge trigger-type D-type flip-flop (to be referred to as D FF hereafter) 28. The Q output signal from the D FF 28 is supplied to the other input terminal of the NOR gate 26. The $\bar{Q}$ output signal from the D FF 28 is supplied to the other input terminal of the NOR gate 25 and a D input terminal of the D FF 28.

An output signal G1 from the NOR gate 25 is supplied to a J input terminal of a positive-edge trigger-type JK flip-flop (to be referred to as a JK FF hereinafter) 29. Furthermore, an output signal G2 from the NOR gate 26 is supplied to a K input terminal of the JK FF 29. The clock signal CLK is supplied to a clock input terminal of the JK FF 29.

A signal PS from a preset circuit 35 is supplied to preset terminals of the D FF 28 and the JK FF 29.

A second oscillator 31 generates a signal of a frequency fc. A third oscillator 33 generates a signal of a frequency fb (fb<fc). The output signals from the oscillators 31 and 33 are supplied to a timing circuit 32 through a selector 30. More specifically, the output signal from the oscillator 31 is supplied to the input terminal of the timing circuit 32 through a first switch 30A. The output signal from the oscillator 33 is supplied to the timing circuit 32 through a second switch 30B. When the Q output from the JK FF 29 goes to H level, the switch 30A is turned on so as to supply the output signal of the frequency fc from the oscillator 31 to the circuit 32. When the $\bar{Q}$ output from the JK FF 29 goes to H level, the switch 30B is turned on, thereby supplying the output signal of the frequency fb from the oscillator 33 to the circuit 32.

Upon reception of the signal of the frequency fb, the circuit 32 supplies to an exciting circuit 34 an excitation signal of a frequency fEb, and upon reception of the signal of the frequency fc, supplies thereto an excitation signal of a frequency fEc (fEb<fEc). The circuit 34 supplies to the coils 12 an excitation current EI of a frequency (fEb or fEc) corresponding to the frequency (fEb or fEc) of the input excitation signal.

In response to the input signal, the circuit 32 supplies sampling control signals SA and SB to the circuit 22 at a timing immediately before the voltage level of the excitation signal is switched (i.e., at a timing immediately before a level of the excitation current EI is changed). The signals SA and SB goes to H level for a predetermined period.

In response to the signals SA and SB, the circuit 22 samples the voltage level of the signal from the pre-amplifier 21 during the H-level period of the signals SA and SB. The output signal from the circuit 22 is supplied to a signal processing circuit 36, and is subjected to predetermined signal processing.

A cut-off frequency of the circuit 23 is set at (fEc+fEb)/2. A cut-off frequency of the circuit 24 is set at fEb.

Since noise generally has a basic frequency component and a harmonic frequency component, the frequencies fEb and fEc must not have an integer ratio.

The operation of the electromagnetic flowmeter shown in FIG. 1 will be described with reference to FIGS. 2A to 2M and 3A to 3J. FIG. 2A shows the clock signal CLK; FIG. 2B, the Q output from the D FF 28; FIG. 2C, the $\overline{Q}$ output from the D FF 28; FIG. 2D, the output signal FH from the circuit 23; FIG. 2E, the output signal FL from the circuit 24; FIG. 2F, the output signal G1 from the NOR gate 25; FIG. 2G, the output signal G2 from the NOR gate 26; FIG. 2H, an ON/OFF state of the switch 30A; FIG. 2I, an ON/OFF state of the switch 30B; FIG. 2J, the output signal PS from the circuit 35; FIG. 2K, the excitation current EI; and FIG. 2L, the sampling control signal SA; FIG. 2M, the sampling control signal SB.

(1) First, the operation sequence of the electromagnetic flowmeter will be described with reference to FIGS. 2A to 2M when the fluid to be measured flows through the pipe 11 and the electromotive force detected by the electrodes 13 does not include a noise component.

① Assume that after power is ON, the preset circuit 35 is operated so that the signal PS is set at H level, as shown in FIG. 2J, and the D FF 28 and the JK FF 29 are preset.

During a preset period, the JK FF 29 is in a set state, and the Q output therefrom goes to H level and the $\overline{Q}$ output goes to L level. The switch 30A is turned on (FIG. 2H), and the switch 30B is turned off (FIG. 2I). A signal of the frequency fc (high frequency) is supplied to the timing circuit 32. The excitation signal of the frequency fEc is supplied to the exciting circuit 34. The circuit 34 supplies the excitation current EI of the frequency fEc to the excitation coils 12. The electromotive force detected by the electrodes 13 becomes a signal of the frequency fEc. The signal is supplied to the pre-amplifier 21, and is generated as the signal of the frequency fEc. Note that the voltage level of the output signal from the pre-amplifier 21 is proportional to a flow velocity of the measured fluid.

In response to the signal of the frequency fEc, the circuit 23 generates the H-level signal FH. Thus, the output signal G1 from the NOR gate 25 is at L level (FIG. 2F). On the other hand, the Q output from the D FF 28 is at H level (FIG. 2B). Thus, the output signal G2 from the NOR gate 26 is also at L level.

② At a timing shown in FIG. 2J, assume that the preset state is cancelled, and the signal PS goes to L level.

③ At a time t0, the clock signal CLK goes to H level (FIG. 2A). At this time, the L level signals G1 and G2 (FIGS. 2F and 2G) are kept supplied to the J and K input terminals of the JK FF 29. Thus, the FF 29 is kept unchanged, and the switch 30A is kept ON (FIG. 2H). Therefore, the excitation signal of the frequency fEc is supplied to the circuit 34. The excitation current EI of the frequency fEc is supplied to the coils 12 (FIG. 2K). Then, the electromotive force of the frequency fEc is generated at the electrodes 13. In response to the electromotive force, the pre-amplifier 21 generates the signal of the frequency fEc.

Upon reception of the signal of the frequency fEc, the circuit 23 continuously generates the H-level signal FH, and the circuit 24 continuously generates the L-level signal FL.

④ At a time T1, the clock signal CLK goes to L level. In synchronism with the trailing edge of the signal CLK, the state of the D FF 28 is reversed. That is, the Q output from the D FF 28 goes to L level and the $\overline{Q}$ output therefrom goes to H level (FIGS. 2B and 2C). The output signal G1 from the NOR gate 25 is kept at L level (FIG. 2F), and the output signal G2 from the NOR gate 26 goes to H level (FIG. 2G).

⑤ At a time T2, the clock signal CLK goes to H level. In this case, the J input terminal receives the L-level signal G1, and the K input terminal receives the H-level signal G2 (FIGS. 2F and 2G). Therefore, in synchronism with the leading edge of the clock signal CLK, the Q output from the FF 29 goes to L level, and the $\overline{Q}$ output therefrom goes to H level. Thus, the switch 30B is turned on, and the switch 30A is turned off (FIGS. 2H and 2I). The signal of the frequency fb (low frequency) is supplied to the circuit 32. Thus, the circuit 32 generates the excitation signal of the frequency fEb, and the circuit 34 supplies to the coils 12 the excitation current EI of the low frequency fEb (FIG. 2K). For this reason, the output signal from the pre-amplifier 21 becomes the signal of the frequency fEb. Therefore, at a timing slightly delayed from the time T2 because of the time lag of the circuits 23, 24, the circuit 23 generates the L-level signal, and the circuit 24 generates the H-level signal (FIG. 2D and 2E). Thus, the output signal G1 from the NOR gate 25 is kept at L level and the output signal G2 from the NOR gate 26 goes to L level (FIGS. 2F and 2G).

⑥ In synchronism with the trailing edge of the clock signal CLK at a time T3, the contents of the D FF 28 are reversed (FIGS. 2B and 2C). Thus, the output signal G1 from the NOR gate 25 goes to H level, and the output signal G2 from the NOR gate 26 is kept at L level.

⑦ At a time T4, the clock signal CLK goes to H level. A is time, the signal G1 supplied to the J input terminal of the FF 29 is at H level, and the signal G2 supplied to the K input terminal thereof is at L level. For this reason, the contents of the FF 29 are reversed, i.e., the Q output therefrom goes to H level and the $\overline{Q}$ output goes to L level. Therefore, the switch 30A is turned on, and the excitation current EI of the high frequency fEc is supplied to the coils 12. The output signal FH from the circuit 23 goes to H level, and the output signal FL from the circuit 24 goes to L level (FIGS. 2D and 2E). Thereafter, the same operations at the times T0 to T4 are repeated. As shown in FIG. 2K, the excitation currents EI of frequencies fEb and fEc are alternately supplied to the coils 12.

Figures 2A, 2B, 2C:
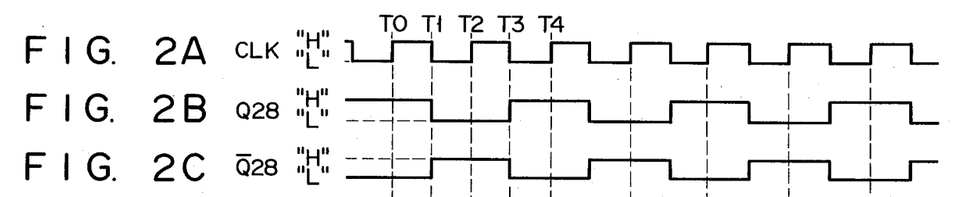
Figure 2D:
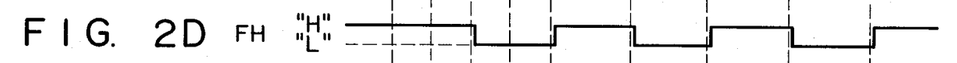
Figure 2E:
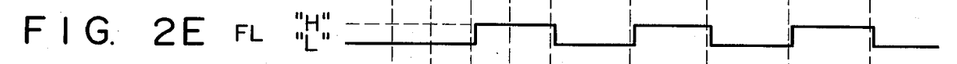
Figure 2F:
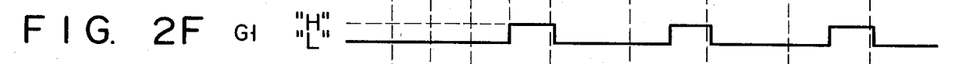
Figure 2G:
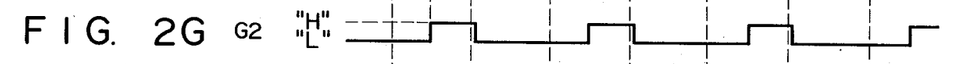
Figure 2H:
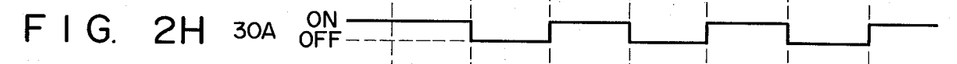
Figure 2I:
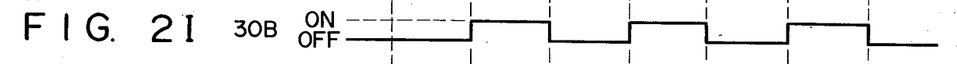
Figure 2J:
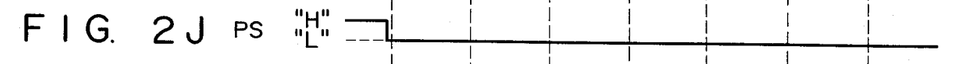
Figure 2K:
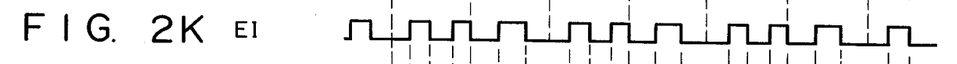
Figure 2L:
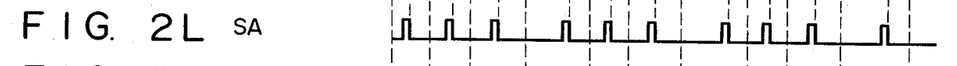

During the above operations, the circuit 32 supplies to the circuit 22 the control signals SA and SB for sampling data at a timing at which the excitation current EI is stabilized, i.e., immediately before the direction of the current EI is reversed (FIG. 2L). The sampled signal is supplied to the circuit 36, and is subjected to predetermined signal processing.

(2) The operation of the electromagnetic flowmeter will be described when the fluid to be measured is not flowing through the pipe 11 and no noise component is included.

In this case, an electromotive force is not generated at the electrodes 13, and the output from the pre-amplifier 21 is at "0" level. For this reason, the output signals FH and FL from the circuits 23 and 24 go to L level. Thus, the output signals G1 and G2 from the NOR gates 25 and 26 change in accordance with the state of the FF 28. When the Q output from the FF 28 is at H level, the signal G1 goes to H level and the signal G2 goes to L level. When the $\overline{Q}$ output from the FF 28 is at H level, the signal G1 goes to L level, and the signal G2 goes to H level. The contents of the FF 28 are reversed in synchronism with the trailing edge of the clock signal CLK. Therefore, the contents of the JK FF 29 are reversed in synchronism with the leading edge of the clock signal CLK. The switches 30A and 30B are alternately turned on. In this case, the excitation currents EI of the frequencies fEc and fEb are alternately supplied to the coils 12.

Figure 3A:
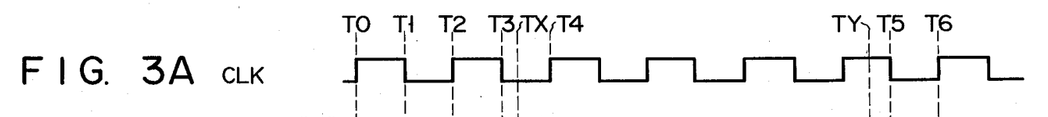
Figure 3B:
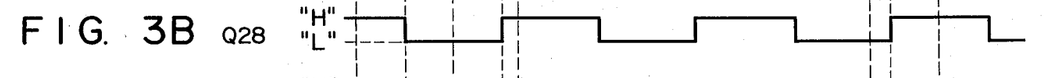
Figure 3C:
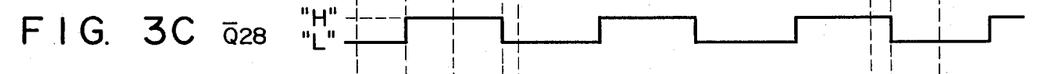
Figures 3D, 3E, 3F:
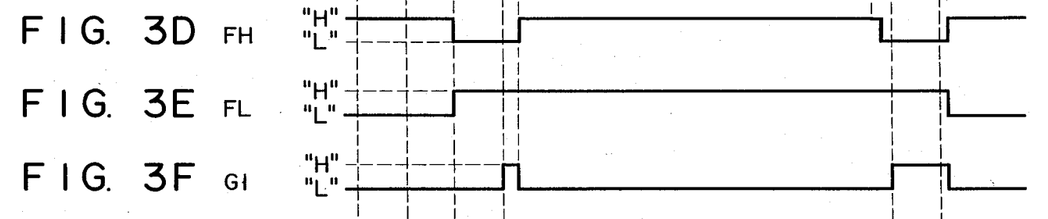
Figure 3G:
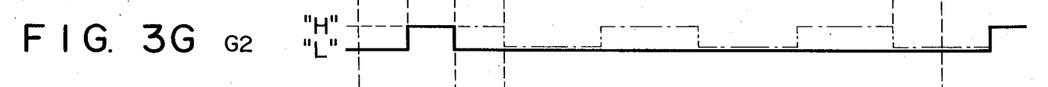
Figure 3H:
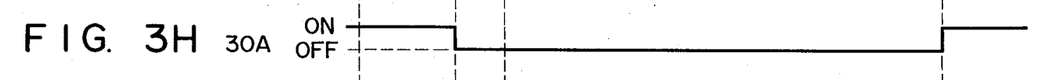
Figures 3I, 3J:
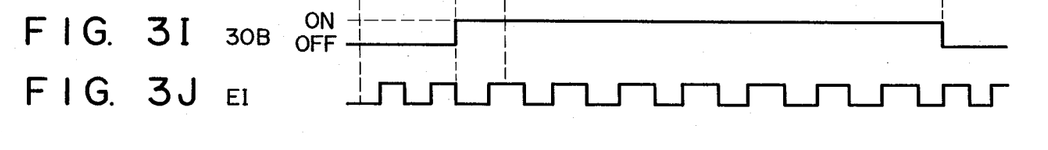

(3) The operation of the electromagnetic flowmeter will be described with reference to FIGS. 3A to 3J when a fluid to be measured flows through the pipe 11, and the electromotive force includes a noise component. Note that FIG. 3A shows the clock signal CLK; FIG. 3B, the Q output from the D FF 28; FIG. 3C, the $\overline{Q}$ output from the D FF 28; FIG. 3D, the output signal FH from the circuit 23; FIG. 3E, the output signal FL from the circuit 24; FIG. 3F, the output signal G1 from the NOR gate 25; FIG. 3G, the output signal G2 from the NOR gate 26; FIG. 3H, an ON/OFF state of the switch 30A; FIG. 3I, an ON/OFF state of the switch 30B; and FIG. 3J, a waveform of the excitation current EI.

FIGS. 3A to 3J are timing charts when a noise component of a frequency of (fb+fc)/2 or more is included in the electromotive force. Assume that the noise component is superposed after a time Tx, and eliminated after a time Ty. Therefore, the electromagnetic flowmeter is first operated as shown in FIGS. 2A to 2L.

Note that FIG. 3G include a solid line graph and chain lines graph, and a graph indicated by the solid line in FIG. 3G corresponds to this case.

① When the preset state is cancelled, the electromotive force does not include a noise component. For this reason, the electromagnetic flowmeter is operated as shown in FIGS. 2A to 2L. The excitation current EI of the high frequency fEc is supplied to the coils 12 after cancelling the preset state until the time T2. After the time T2, the excitation current EI of the low frequency fEb is supplied to the coils 12.

② Assume that the noise component is superposed in the electromotive force after the time Tx.

Since the noise component has a high frequency as described above, the circuit 23 thereafter generates the H-level signal FH. The output signal G1 from the NOR gate 25 goes to L level. The circuit 24 generates the H-level signal FL in response to the electromotive force of the frequency fEb. The output signal G2 from the NOR gate 26 is thus kept at L level. Thus, the L-level signals G1 and G2 are supplied to the J and K input terminals of the JK FF 29, respectively. Even if the clock signal CLK goes to H level, the FF 29 is left unchanged. The switch 30A is held in the OFF state, and the switch 30B is held in the ON state. The circuit 34 generates the excitation current EI of the frequency fEb in response to the excitation signal of the frequency fEb. The coils 12 are excited by the excitation current EI of the low frequency fEb farther from a frequency of the noise component.

Until the noise component is eliminated, the FF 29 is left unchanged. For this reason, the excitation signal of the frequency fEb is supplied to the circuit 34, and the circuit 34 excites the coils 12 by the current EI of the frequency fEb in response to the excitation signal.

③ Assume that the noise component is eliminated at the time Ty. The output signal FH from the circuit 23 goes to L level at a timing slightly delayed from the time Ty.

④ At a time T5, the clock signal CLK goes to L level (FIG. 3A). In synchronism with the trailing edge of the signal CLK, the contents of the D FF 28 are reversed. Thus, the output signal G1 from the NOR gate 25 goes to H level. On the other hand, the output signal G2 from the NOR gate 26 is kept at L level.

⑤ At a time T6, the clock signal CLK goes to H level. At this time, the H-level signal G1 is supplied to the J input terminal of the JK FF 29, and the L-level signal G2 is supplied to the K input terminal thereof. Thus, the contents of the JK FF 29 are reversed. That is, the Q output from the FF 29 goes to H level and the $\overline{Q}$ output therefrom goes to L level. The switch 30A is turned on. The excitation signal of the frequency fEc is supplied to the circuit 34, and the excitation current EI of the frequency fEc is supplied to the coils 12. Thereafter, the excitation currents of frequencies fEc and fEb are alternately supplied to the coils 12.

(4) The operation of the electromagnetic flowmeter will be described when the fluid is not flowing through the pipe 11 and a noise component of a high frequency is present.

Since the noise component of the high frequency is present, the circuit 23 generates the H-level signal. The NOR gate 25 generates the L-level signal G1 in response to this. The voltage level of the electromotive force corresponding to the flow rate is 0. For this reason, the circuit 24 generates the L-level signal FL. The output signal G2 from the NOR gate 26 is determined by the level of the Q output from the FF 28, and alternately goes to H and L levels at every period of the clock signal CLK, as indicated by an alternate chain line FIG. 3G.

The L-level signal G1 is supplied to the J input terminal of the FF 29, and the signal G2 which alternately goes to H and L levels is supplied to the K input terminal thereof. For this reason, once the Q output from the FF 29 goes to L level and the $\overline{Q}$ output therefrom goes to H level, the FF 29 maintains this state. Therefore, the switch 30B is kept ON, and coils 12 are excited by the excitation current EI of the frequency fEb.

When a noise component of a frequency lower than the low frequency fEb is superposed in the electromotive force, the cicuits 23 and 24 and the NOR gates 25 and 26 perform operations opposite to those described above. Therefore, when a noise component of low frequency is superposed in the electromotive force, the coils 12 are excited by the excitation current EI of the high frequency fEc.

(5) An electrochemical noise component is generated by a piston pump. The output from the electromagnetic flowmeter becomes unstable due to influence of the noise component when frequencies of the noise component and the excitation current EI coincide with each other or very close to each other. However, in the electromagnetic flowmeter according to the above embodiment, when the noise component is superposed in the electromotive force, the frequency of the excitation current EI is fixed at a frequency farther from that of the noise component, thereby driving the coils 12. For this reason, influence of the electrochemical noise component due to influence of the pump can be eliminated. Even if the noise component is superposed in the electromotive force, a flow rate can be stably measured.

Furthermore, in the above embodiment, normally the excitation current EI is alternately switched to the frequencies fEb and fEc so as to drive the detector (excitation coils). For this reason, superposing in of the noise component in the electromotive force canbe reliably detected. (When the excitation coils are excited by the excitation current of one frequency, it is difficult to discriminate the electromotive forces based upon the flow rate and the noise component. )

Figure 4:
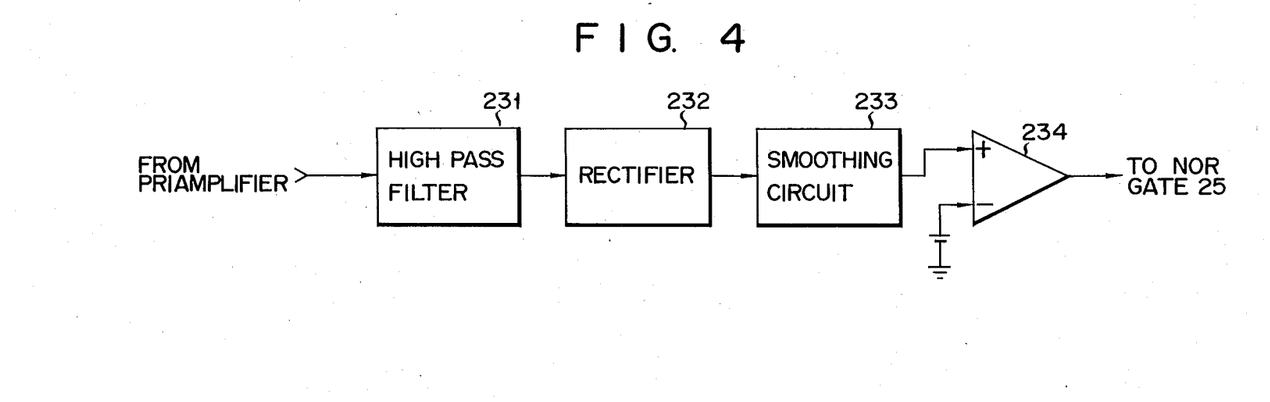
FIG. 4 is a circuit diagram showing an example of a circuit configuration of a high-pass filter circuit shown in FIG. 1.

A detailed circuit configuration of the high-pass and low-pass filter circuits 23 and 24 will be described with reference to FIG. 4. FIG. 4 shows an example of the arrangement of the circuit 23. A signal from the preamplifier 21 is supplied to a high-pass filter 231. A low cut-off frequency of the filter 231 is set at (fEb+fEc)/2. The output signal from the filter 231 is supplied to a rectifier 232. The output from rectifier 232 is supplied to a smoothing circuit 233. The smoothed signal is supplied to a comparator 234. The comparator 234 compares a voltage level of the input signal and a predetermined reference voltage level. When the level of the input signal is higher than that of the reference voltage, the comparator 234 generates the H-level signal.

In order to obtain the low-pass filte circuit 24, the filter 231 shown in FIG. 4 can be replaced with a low-pass filter of a high cut-off frequency fEb.

Figure 1:
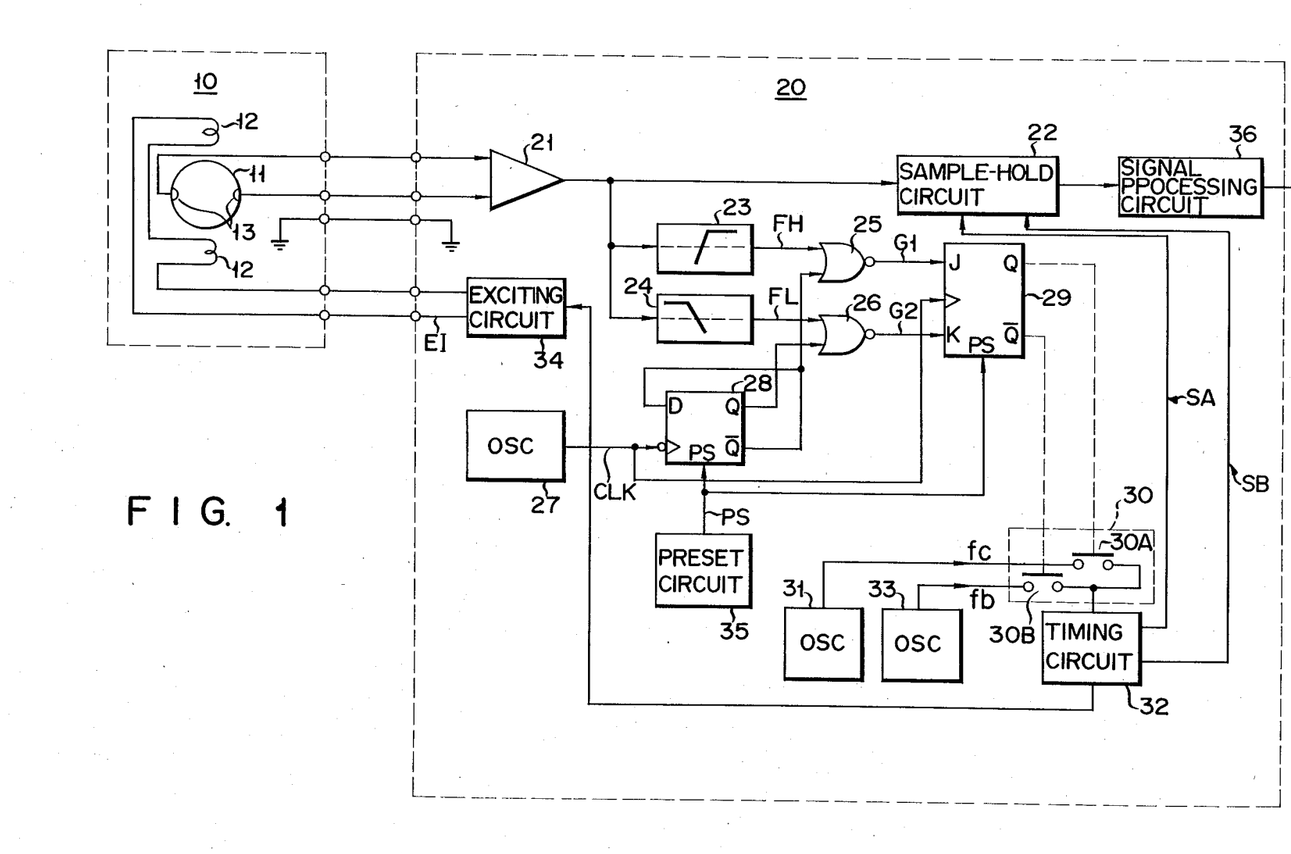
FIG. 1 is a circuit diagram showing an arrangement of an electromagnetic flowmeter according to an embodiment of the present invention.
Figure 2M:
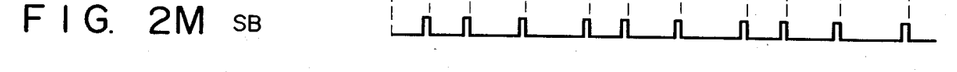

In the circuit shown in FIG. 1, the high-pass and low-pass filter circuits 23 and 24 are used which generate H-level signals when a signal of a frequency higher or lower than a predetermined frequency is inputted. The present invention is not limited to this. A band-pass filter circuit of a high cut-off frequency fEc and a low cut-off frequency of (fEc+fEb)/2 can be used in place of the high-pass filter circuit 23. In addition, a band-pass filter circuit with a center frequency fEb can be used in place of the low-pass filter circuit 24. These band-pass filter circuits can be achieved by using band-pass filters having a predetermined pass band in place of the high-pass filter 231 in FIG. 4.

Figure 5:
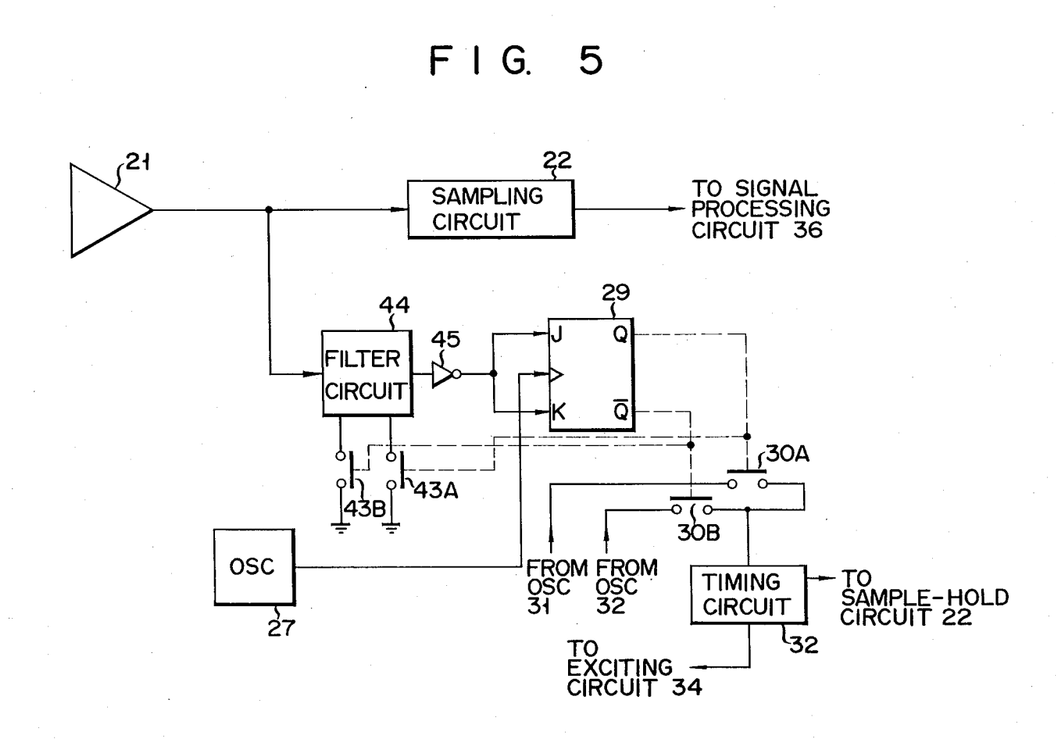
FIG. 5 is a circuit diagram showing another example of a circuit configuration of high-pass and low-pass filter circuits shown in FIG. 1.

As shown in FIG. 5, a single programable band-pass filter can be used in place of the circuits 23 and 24.

Referring to FIG. 5, the output signal from the preamplifier 21 is supplied to a band-pass filter circuit 44. The circuit 44 serves as a band-pass filter circuit with a center frequency fEb when a switch 43A is turned on. The circuit 44 serves as a band-pass filter circuit of a low cut-off frequency (fEc+fEb)/2 when a switch 43B is turned on. Note that the circuit 44 generates an H-level signal upon reception of a signal of a predetermined band-pass frequency. The output signal from the circuit 44 is supplied to the J and K input terminals of the JK FF 29 through an inverter 45. The Q output from the JK FF 29 is supplied to the switches 30A and 43A. The $\bar{Q}$ output signal from the FF 29 is supplied to the switches 30B and 43B.

When the Q output signal from the JK FF 29 is at H level, the switch 30A is turned on. Thus, the excitation current EI has the frequency fEc. Simultaneously, the switch 43A is turned on, and the circuit 44 serves as a band-pass filter circuit of the high cut-off frequency fEb. On the other hand, when the $\bar{Q}$ output signal from the FF 29 is at H level, the switch 30B is turned on and the excitation current EI of the frequency fEb is supplied to the coils 12. The switch 43B is also turned on, and the circuit 44 serves as a band-pass filter circuit of the high cut-off frequency fEc and the low cut-off frequency (fEc+fEb)/2. In other words, when the excitation current EI has the high frequency (fEc), the circuit 44 detects whether or not a noise component of a frequency lower than fEb is superposed. When the excitation current EI has the low frequency (fEb), the circuit 44 detects whether or not a noise of the high frequency falling within the range between fEc to (fEc+fEb)/2 is superposed in.

Figure 6:
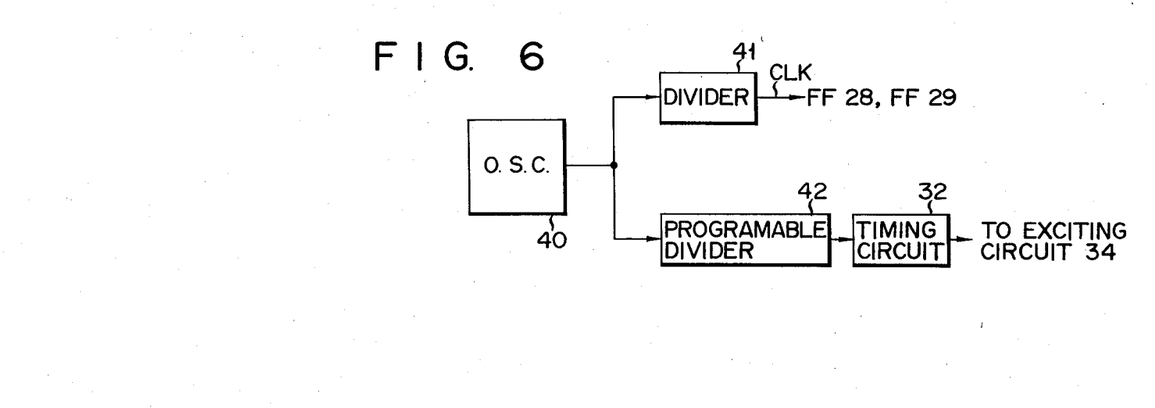
FIG. 6 is a circuit diagram showing an example of an arrangement when a single oscillator is used instead of three oscillators shown in FIG. 1.

In the above embodiment, the three oscillators 27, 31 and 33 are used and are independently driven. The present invention is not limited to this. For example, as shown in FIG. 6, a single oscillator 40 can be used. In this case, the output from the oscillator 40 is frequency divided by a frequency divider 41 so as to obtain a clock signal for the FFs 28 and 29. The output signal from the oscillator 40 can be frequency divided by a programable frequency divider 42 so as to obtain signals of two different frequencies fb and fc.

The frequencies fEb and fEc are arbitrarily set in correspondence with, e.g., a frequency of a pump. When a rotation frequency of a double-acting multicylinder pump is about 1.5 Hz, and a delivery frequency of the pump is about 6 Hz, the frequency fEb is set at about 5 Hz, and the frequency fEc is set at about 6.4 Hz. On the other hand, the clock signal CLK (FIG. 2A) is set to be lower than these frequencies, e.g., at about 1 Hz. However, these frequencies are examples, and the present invention is not limited to this.

The cut-off frequencies of the filter circuits are not limited to the above-mentioned frequencies. For example, the high cut-off frequency of the circuit 24 can coincide with the low cut-off frequency (fEb+fEc)/2 of the circuit 23. The present invention is not limited to this, and cut-off frequencies can be arbitrarily set within the scope of the invention.

The arrangement of the coils 12, the electrodes 13 and the circuit 34 is not limited to that shown in FIG. 1. For example, the number of the coil 12 or the electrode 13 is not limited to one pair, but can be two pairs or one. In the above embodiment, the circuit 34 generates excitation currents of different frequencies upon reception of the excitation signal from the circuit 32. However, the present invention is not limited to this, and the circuit 34 can generate excitation currents of different frequencies in reponse to the output signal from the JK FF 29. Needless to say, the circuit constituted by the FFs 28 and 29, the NOR gates 25 and 26, and the filter circuits 23 and 24 can be desirably modified. Any circuit configuration can be adopted which can prevent the FF 29 from being inverted when the excitation current EI has the frequency fEc and the circuit 23 generates the H-level signal, or when the current EI has the frequency fEb and the circuit 23 generates the H-level signal.

The circuit 34 can be configured, for example, as follows. Two constant current sources are provided and generate currents in opposite directions. In addition, a switch is provided for selecting one of the output currents of the constant current sources in accordance with the voltage level of the excitation signal and for supplying the selected current to the coils 12.

The number of frequencies of the excitation current EI is not limited to two (fEb, fEc). Three or more frequencies can be suitably combined to obtain the excitation current. When a noise component is generated, the frequency of the current EI is fixed at a frequency farthest from that of the noise so as to excite the excitation coils. In this case, the type and the number of the filter circuits are not limited to two. Three or more filter circuits having different pass bands can be employed.

A test was conducted for confirming effects of the electromagnetic flowmeter shown in FIG. 1.

From the test results, it was confirmed that influence of the electrochemical noise with respect to a measurement value could be reduced to an ignorable extent when the frequency of the excitation current was slightly changed by, e.g, 1 Hz. For this reason, as in the electromagnetic flowmeter according to the above embodiment, a method for changing a frequency of an excitation current EI in correspondence with that of a noise component is very effective. Therefore, as described above, when the frequency fEb was set at 5 Hz and the frequency fEc was set at 6.4 Hz, influence of the electrochemical noise component was almost completely eliminated.

What is claimed is:

1. An electromagnetic flowmeter comprising:
   a measuring pipe through which a conductive fluid to be measured can flow;
   at least one excitation coil for applying, upon reception of an excitation current, a magnetic flux corresponding to the excitation current to the fluid in the measuring pipe;
   electrodes for detecting the electromotive force induced in the fluid due to a mutual effect by the fluid and the magnetic flux applied to the fluid by said excitation coil;
   noise detection means for detecting, upon reception of the electromotive force detected by said electrodes, the noise included in the electromotive force;
   excitation current supply means for alternately and selectively supplying, upon reception of an output signal from said noise detection means, one of at least two excitation currents which have different frequencies to said excitation coil every predetermined period when said noise detection means detects no noise, and for supplying one excitation current whose frequency is farthest from the frequency of the noise when said noise detection means detects the noise; and
   flow rate detection means for calculating, upon reception of the electromotive force detected by said electrode, the flow rate of the fluid based upon the electromotive force.

2. A flowmeter according to claim 1, wherein said excitation current supply means comprises:
   signal means for generating at least two signals,
   selection means for alternately selecting and outputting, upon reception of the output signal from said noise detection means, one of the two signals from said signal means when said noise detection means detects no noise component, and
   a supply circuit for supplying, upon reception of the output signal from said selection means, an excitation current whose frequency corresponds to the output signal from said selection means to said excitation coil; and
   said selection means selects, when said noise detection means detects a noise component, one of the two signals from said signal means so that said supplying circuit supplies the excitation current which has a frequency farthest from that of the noise component.

3. A flowmeter according to claim 1, wherein said noise detection means comprises:
   a first filter circuit for generating a predetermined signal upon reception of a signal of a frequency higher than a first cut-off frequency; and
   a second filter circuit for generating a predetermined signal upon reception of a signal of a frequency lower than a second cut-off frequency.

4. A flowmeter according to claim 1, wherein the two excitation currents are first and second excitation currents; and
   said noise detection means comprises:
   at least one switch means operative in synchronism with the switching of first and second excitation currents generated by said excitation current supply means, and
   a band-pass filter in which the cut-off frequency is programably set in response to the operation of said switch means.

5. A flowmeter according to claim 1, wherein said excitation current supply means supplies to said excitation coil the excitation currents whose frequencies do not have an integer ratio.

6. A flowmeter according to claim 1, wherein said excitation current supply means comprises:
   an oscillator for generating a clock signal having a predetermined frequency;
   dividing means, connected to said oscillator, for frequency dividing the clock signal upon reception thereof to generate at least two signals;
   selection means, connected to said dividing means and said noise detection means and responsive to the output signal from said noise detection means, for outputting alternately and selectively one of the two signals from said dividing means when said noise detection means detects no noise component; and
   a supply circuit, connected to said selection means, for supplying the excitation current with a frequency corresponding to that of the signal supplied from said selection means, said selection means outputting a signal from said dividing means so that said supply circuit supplies the excitation current of a frequency farthest from that of the noise component when said noise detection means detects a noise component.

7. A flowmeter according to claim 1, wherein said noise detection means comprises:
   a first filter circuit for generating a predetermined signal upon reception of a signal of a frequency higher than a first frequency, and a second filter circuit for generating a predetermined signal upon reception of a signal of a frequency equal to or lower than a second frequency, the second frequency being equal to or lower than the first frequency; and
   said excitation current supply means comprises:
   supply means for supplying alternately and selectively a first excitation current of a frequency higher than the first frequency and a second excitation current of a frequency lower than the second frequency to said excitation coil, and
   control means, connected to said first and second filter circuits and responsive to the output signals therefrom, for causing said supply means to continuously generate the first excitation current as long as said excitation current supply means supplies the first excitation current to said excitation coil and said second filter circuit generates the predetermined signal, and for causing said supply means to continuously generate the second excitation current as long as said excitation current supply means supplies the second excitation current to said excitation coil and said first filter circuit generates the predetermined signal.

8. A flowmeter according to claim 7, wherein said first and second filter circuits comprise:
a single programmable filter circuit, connected to said supply means, for detecting the first excitation current when said supply means supplies the first excitation current to thereby serve as a filter circuit having the second frequency as a high cut-off frequency, and for detecting the second excitation current when said supply means supplies the second excitation current to thereby serve as a filter having the first frequency as a low cut-off frequency.

9. A flowmeter according to claim 1, wherein said noise detection means comprises:
a first filter circuit for generating a predetermined signal upon reception of a signal of a frequency higher than a first frequency, and a second filter circuit for generating a predetermined signal upon reception of a signal of a frequency equal to or lower than a second frequency, the second frequency being equal to or lower than the first frequency; and said excitation current supply means comprises:
a flip-flop whose content is inverted at every predetermined period,
a supply circuit for selectively supplying a first excitation current of a frequency higher than the first frequency and a second excitation current of a frequency lower than the second frequency in response to an output from said flip-flop, and
control means, connected to said first and second filter circuits and responsive to the output signals therefrom, for detecting the predetermined signal from said second filter circuit, when said supply circuit supplies the first excitation current to said excitation coil and said second filter circuit generates the predetermined signal and for detecting the predetermined signal from said first filter circuit, when said supply circuit supplies the second excitation current to said excitation coil and said first filter circuit generates the predetermined signal, thereby preventing said flip-flop from being inverted.

10. A flowmeter according to claim 9, wherein said first and second filter circuits comprise a single programmable filter circuit, connected to said supply circuit, for detecting the first excitation current, when said supply circuit supplies the first excitation current, to thereby serve as a filter circuit having the second frequency as a high cut-off frequency, and for detecting the second excitation current, when said supply circuit supplies the second excitation current, to thereby serve as a filter circuit having the first frequency as a low cut-off frequency.

11. An electromagnetic flowmeter comprising:
a measuring pipe through which a fluid to be measured can flow;
at least one excitation coil for applying, upon reception of an excitation current, a magnetic flux corresponding to the excitation current to the conductive fluid flowing through said pipe;
electrodes for detecting an electromotive force induced in the fluid by a mutual effect of the magnetic flux applied to the conductive fluid and the fluid itself;
a first filter circuit, connected to said electrode, for receiving the electromotive force detected by said electrodes and generating a predetermined signal upon reception of a signal of a frequency equal to or higher than a first frequency;
a second filter circuit, connected to said electrode, for receiving the electromotive force detected by said electrodes and generating a predetermined signal upon reception of a signal of a frequency equal to or lower than a second frequency which is lower than the first frequency;
flip-flop means whose content is inverted at every given period;
supply means for selectively supplying to said excitation coil a first excitation current of a frequency equal or higher than the first frequency and a second excitation current of a frequency equal or lower than the second frequency in response to an output signal from said flip-flop means;
control means, connected to said first and second filter circuits and responsive to the output signals therefrom, for detecting the predetermined signal from said second filter circuit, when said excitation current supply means supplies the first excitation current to said excitation coil and said second filter circuit generates the predetermined signal, and for detecting the predetermined signal from said first filter circuit, when said excitation current supply means supplies the second excitation current to said excitation coil and said first filter circuit supplies the predetermined signal, thereby preventing said flip-flop means from being inverted; and
flow rate detection means, connected to said electrode, for sampling the electromotive force detected by said electrodes so as to obtain the flow rate of the fluid based upon the sample value.

* * * * *